US 8,341,651 B2

(12) United States Patent
Kapadia et al.

(10) Patent No.: US 8,341,651 B2
(45) Date of Patent: Dec. 25, 2012

(54) INTEGRATING ENTERPRISE SEARCH SYSTEMS WITH CUSTOM ACCESS CONTROL APPLICATION PROGRAMMING INTERFACES

(75) Inventors: Arshish Cyrus Kapadia, Issaquah, WA (US); Jonah Sarbin Burke, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1059 days.

(21) Appl. No.: 11/651,657

(22) Filed: Jan. 10, 2007

(65) Prior Publication Data

US 2008/0168037 A1    Jul. 10, 2008

(51) Int. Cl.
G06F 3/00 (2006.01)
G06F 15/16 (2006.01)
G06F 17/30 (2006.01)
(52) U.S. Cl. .................. 719/328; 709/201; 707/709
(58) Field of Classification Search .................. None
See application file for complete search history.

(56) References Cited

U.S. PATENT DOCUMENTS

| | | | |
|---|---|---|---|
| 5,675,782 A * | 10/1997 | Montague et al. ............. 726/4 |
| 5,761,669 A | 6/1998 | Montague et al. |
| 5,903,720 A | 5/1999 | Stokes |
| 6,182,142 B1 | 1/2001 | Win et al. |
| 6,381,602 B1 | 4/2002 | Shoroff et al. |
| 6,643,690 B2 | 11/2003 | Duursma et al. |
| 6,928,469 B1 | 8/2005 | Duursma et al. |
| 6,934,859 B2 | 8/2005 | Aull |
| 6,944,613 B2 | 9/2005 | Lef et al. |
| 6,981,042 B1 | 12/2005 | Rey |
| 7,031,954 B1 | 4/2006 | Kirsch |
| 2003/0014656 A1 | 1/2003 | Ault et al. |
| 2003/0061256 A1 * | 3/2003 | Mathews et al. ............. 709/101 |
| 2003/0135582 A1 | 7/2003 | Allen et al. |
| 2004/0158527 A1 | 8/2004 | Lambert |
| 2005/0060286 A1 | 3/2005 | Hansen et al. |
| 2005/0262189 A1 | 11/2005 | Mamou et al. |
| 2005/0262190 A1 | 11/2005 | Mamou et al. |
| 2006/0036748 A1 | 2/2006 | Nusbaum et al. |
| 2006/0080316 A1 | 4/2006 | Gilmore et al. |
| 2006/0155581 A1 | 7/2006 | Eisenberger et al. |
| 2006/0167855 A1 * | 7/2006 | Ishikawa et al. ............. 707/3 |

FOREIGN PATENT DOCUMENTS

| | | |
|---|---|---|
| EP | 0989743 | 3/2000 |
| RU | 2257687 C2 | 3/2003 |
| RU | 2237275 C2 | 7/2003 |
| RU | 2259020 C2 | 8/2005 |

OTHER PUBLICATIONS

International Search Report dated May 9, 2008 in International Application No. PCT/US2008/050552.

(Continued)

*Primary Examiner* — Andy Ho
*Assistant Examiner* — Tuan Dao
(74) *Attorney, Agent, or Firm* — Hope Baldauff Hartman, LLC (57) ABSTRACT

Methods and computer-readable media are provided herein for integrating enterprise search systems with proprietary back-end content store access control APIs. A declarative metadata model is utilized to create and store data defining a custom API exposed by a back-end content store for retrieving access rights for documents stored therein. A normalized API for obtaining access rights for a document is also exposed. When a call is made to the normalized API, the stored data is utilized to transform the call to the normalized API into a call to the custom API.

17 Claims, 5 Drawing Sheets

OTHER PUBLICATIONS

Bertino, et al., "Secure and selective dissemination of XML documents", Date : 2002 , pp. 290-331, vol. 5 , Issue 3, http://delivery.acm.org/10.1145/550000/545190/p290-bertino.pdf?key1=545190&key2=6816481611&coll=GUIDE&dl=GUIDE&CFID=3116139&CFTOKEN=20870418.

Damiani, et al., "A fine-grained access control system for XML documents", Date : 2002 , pp. 169-202, vol. 5 , Issue 2, http://delivery.acm.org/10.1145/510000/505590/p169-damiani.pdf?key1=505590&key2=8529951611&coll=GUIDE&dl=portal,ACM&CFID=11111111&CFTOKEN=2222222.

Goel, et al., "Derived access control specification for XML", Date : 2003 , pp. 1-14, http://delivery.acm.org/10.1145/970000/968561/p1-goel.pdf?key1=968561&key2=8526481611&coll=GUIDE&dl=GUIDE&CFID=3116139&CFTOKEN=20870418.

Chinese Official Action dated Dec. 27, 2010 in Chinese Application No. 20088001938.8.

Chinese Notice of Allowance dated May 26, 2011 in Chinese Application No. 200880001938.8.

European Search Report dated May 25, 2011 in European Application No. 08705786.5.

European Office Action dated Feb. 23, 2012 in European Application No. 08705786.5.

Russian Notice of Allowance dated Sep. 2, 2011 in Russian Application No. 2009126367/08(036693).

Japanese Official Action dated Aug. 31, 2012 in Japanese Application No. 2009-545650.

\* cited by examiner

INTEGRATING ENTERPRISE SEARCH SYSTEMS WITH CUSTOM ACCESS CONTROL APPLICATION PROGRAMMING INTERFACES

BACKGROUND

Enterprise search systems allow content stored within an organization to be indexed, searched, and displayed to authorized users within the organization. In order to provide this functionality, enterprise search engines typically must index and query against structured and unstructured data and documents stored by multiple, independent, third-party enterprise software applications and systems. For instance, in many cases an enterprise search system must index and query against data stored in intranets, document and content management systems, file servers, corporate desktops, business applications such as customer relationship management and business intelligence applications, and other types of content stores.

In contrast to public search engines that search publicly available data and allow virtually any user to execute queries on the data, such as World Wide Web ("Web") search engines, enterprise search systems generally index data for which access may be limited. For instance, a document indexed by an enterprise search system may have an associated access control list ("ACL") that includes one or more access control entries ("ACEs") that identify the access rights a user has to the document. As a result, when an enterprise search system executes a query, it must ensure that the user executing the query has sufficient access rights to view the search results returned in response to the query.

In order to determine whether a user has sufficient access rights to view search results, an enterprise search system may retrieve and store the access rights for a document at the time the document is added to the search index. At query time, the enterprise search system can utilize the previously stored access rights to determine if the user executing the query has sufficient rights to view the search results. Alternatively, an enterprise search system may query the back-end system at which each document in a set of search results is stored for access rights to the document for the user at the time the query is performed. A combination of these methods may also be utilized to minimize drawbacks present in each method.

Regardless of whether the access rights are retrieved at the time a document is added to the search index or at query time, enterprise search systems must interface with the back-end computer systems at which the indexed documents are stored in order to retrieve the access rights. Often, however, the security sub-systems of each third-party back-end computer system utilize application programming interfaces ("APIs") that are disparate, arcane, and proprietary. As a result, it may be necessary to create custom program code to interface with each back-end security sub-system API each time a new type of back-end content store is added to an enterprise search system. This generally makes the integration between enterprise search systems and third-party data store systems difficult, expensive, and time consuming.

It is with respect to these considerations and others that the disclosure made herein is provided.

SUMMARY

Methods and computer-readable media are provided herein for integrating enterprise search systems with custom APIs exposed by back-end content stores for obtaining access rights data. According to aspects presented herein, a declarative metadata model is utilized to create and store data defining a custom API exposed by a back-end content store for retrieving access rights for documents stored therein. A normalized API for obtaining access rights for a document is also exposed. When a call is made to the normalized API, the stored data is utilized to transform the call to the normalized API into a call to the custom API. In this manner, access may be had to access rights stored by a proprietary back-end computing system without writing any program code.

According to one aspect presented herein, data is created and stored that defines a custom API exposed by a back-end computing system for obtaining access rights for a document. The stored data may include information, for instance, identifying parameters of a method exposed by the custom API for obtaining access rights and data indicating whether each of the parameters is an input parameter or an output parameter. One of the parameters may also be tagged to indicate that the parameter corresponds to an identifier for the document for which access rights are requested. Another of the parameters may be tagged to indicate that it corresponds to a system-supplied value, such as the user identifier for the current user. Default values may also be specified and stored for each of the parameters.

According to other aspects, a normalized API may be exposed to applications executing within an enterprise search system for obtaining access rights for a document. The interface presented by the normalized API is a consistent interface that various applications executing within the enterprise search system may utilize to obtain access rights for a document, regardless of the back-end content store on which the document resides. For instance, a search crawler program and a query processor program may both utilize a method exposed by the normalized API to obtain access rights for documents. The method exposed by the normalized API receives a parameter identifying the document for which access rights are requested and may, optionally, receive a user identifier for authentication purposes.

When a call is received to the method exposed by the normalized API for retrieving access rights for a specified document, the call to the normalized API is dynamically transformed into a call to the appropriate custom API using the stored data. For instance, the stored data may be utilized to instantiate a call to a method exposed by the custom API using the default values for its parameters. The parameter identifying the document for which access rights are requested that is received with the call to the normalized API is then substituted for the default value of the parameter tagged as corresponding to the document identifier in the custom API.

According to implementations, the user identifier for the current user may also be substituted for the default value of the parameter tagged as corresponding to a system-supplied value. Once the parameters have been specified, the call to the custom API is executed. The custom API then returns the requested access rights in response to the call. The access rights returned from the custom API are then returned in response to the original call to the normalized API.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following detailed description is directed to systems, methods, and computer-readable media for integrating enterprise search systems with custom back-end content store access control APIs. While the subject matter described herein is presented in the general context of program modules that execute in conjunction with the execution of an operating system and application programs on a computer system, those skilled in the art will recognize that other implementations may be performed in combination with other types of program modules.

Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter described herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for integrating enterprise search systems with custom back-end content store access control APIs will be described. In particular, FIG. 1 is a computer software architecture and network diagram illustrating one operating environment 100 for the subject matter described herein that includes a client computer 102, a network 122, and one or more Web server computers 104A-104B.

Figure 1:
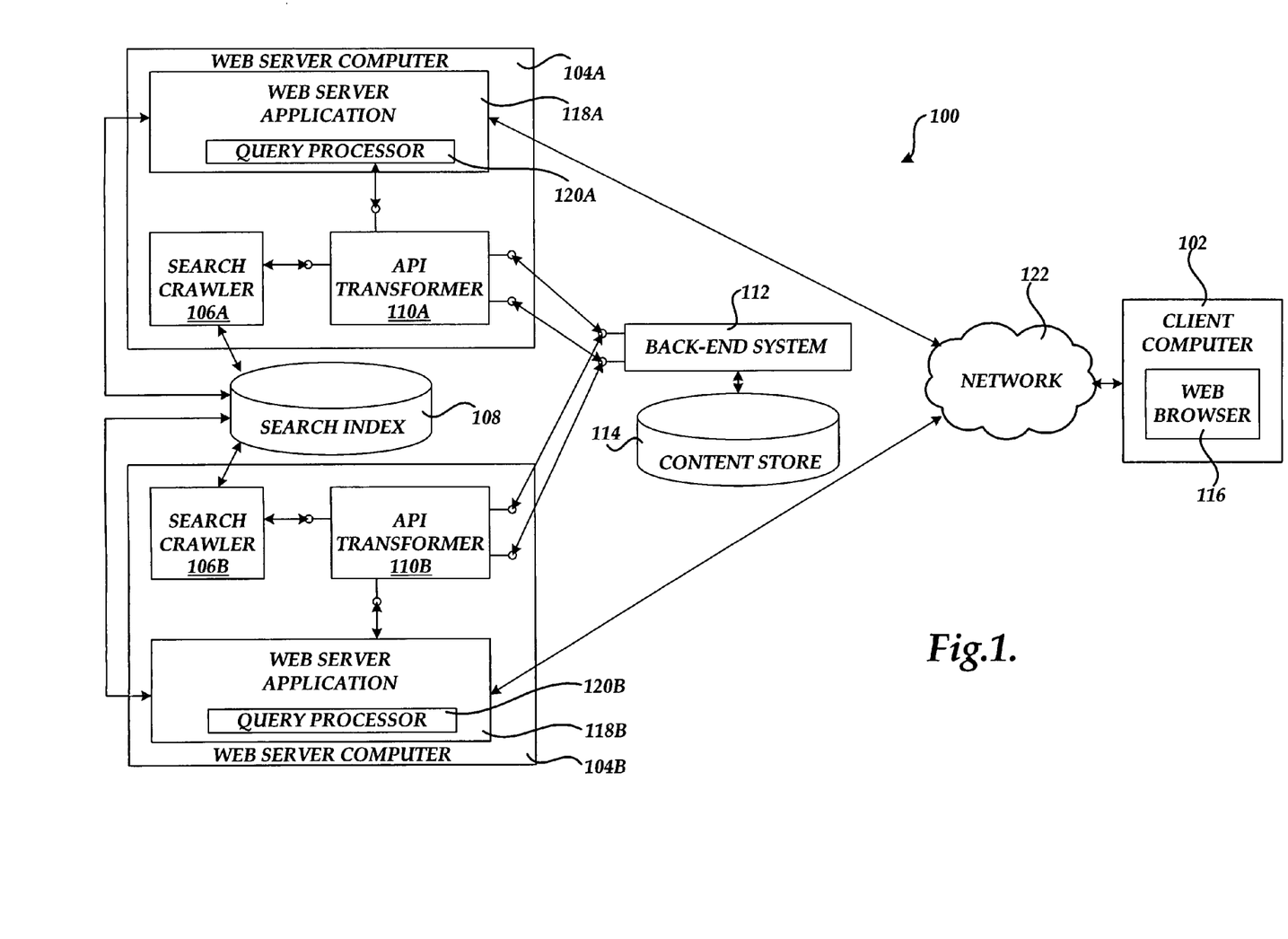
FIG. 1 is a network and software architecture diagram showing an illustrative operating environment for the processes and computer systems described herein, and several of the software components utilized by the computer systems described herein.

As shown in FIG. 1, the client computer 102 and the Web server computers 104A-104B are communicatively coupled to one another through respective connections to the network 122. According to one implementation, the network 122 comprises the Internet. However, it should be appreciated that the network 122 may comprise a LAN, WAN, or other type of network suitable for connecting the client computer 102 and the Web server computers 104A-104B. The Web server computers 104A-104B are also coupled to a back-end system 112. The back-end system 112 is a computing system capable of storing documents in a content store 114. As used herein, the term document means any indexable unit of data. Additional details regarding the operation of the back-end system 112 are provided below.

FIG. 1 also illustrates a number of software components utilized by the client computer 102 and the Web server computers 104A-104B. In particular, the Web server computers 104A-104B are operative to execute the search crawlers 106A-106B, respectively. The search crawlers 106A-106B are application programs designed to gather documents from a variety of sources, such as documents stored in the content store 114 of the back-end system 112. The back-end system 112 may comprise any type of computing system utilized to store content, such as an intranet server, a document or content management system, a file server, a corporate desktop, a business application such as a customer relationship management application or a business intelligence application, or another type of content store.

In order to perform this document identification and indexing process, the search crawlers 106A-106B are seeded with information about content stores. The search crawlers 106A-106B then retrieve documents from the content stores, index the documents, and store the indexed content and any associated metadata in a database called the search index 108. The search crawlers 106A-106B may also identify links to other documents contained in each document and follow the links to obtain and index additional documents. This process is referred to as "crawling."

During the crawl process, the search crawlers 106A-106B may also obtain the access rights for each document that is indexed. For instance, the search crawlers 106A-106B may obtain a list of authorized users for each document. According to one implementation, the access rights are obtained by utilizing the appropriate API transformer 110A-110B to query the back-end system 112 for the list of authorized users. Additional details regarding the use and operation of the API transformers 110A-110B are provided below.

According to one implementation, the client computer 102 includes a Web browser program (referred to herein as a "browser") 116. The browser 116 is operative to request, receive, and display information pages, such as Web pages, from the server computers 104A-104B. In particular, the browser 116 is operative to establish a connection with one of the Web server applications 118A-118B executing on the server computes 104A-104B. Through the connection, the browser 116 may request a Web page for executing a query of the search index 108. Such a query request is processed by a query processor 120A-120B executing on the Web server computer 104A-104B that fields the query request.

The query processors 120A-120B respond to user queries by identifying the documents in the search index 108 that contain the keywords in the user query. The query processors 120A-120B also evaluate whether or not each document should be returned as a search result based upon whether the user performing the query has sufficient access rights to view each document. As will be described in greater detail below, each query processor 120A-120B may dynamically query the back-end system 112 for access rights indicating whether the user executing the query has permissions to view each document in the search results. This query is invoked through the appropriate API transformer 110A-110B.

As will be discussed in greater detail herein, the API transformers 110A-110B expose a normalized API for obtaining the access rights for documents. For instance, in one implementation, the API transformers 110A-110B expose a method for use by the search crawlers 106A-106B for retrieving access rights for documents discovered during the crawl process. In response to a call to such a method, the API transformers 110A-110B translate the normalized call received from the search crawler to the specific custom access rights API exposed by the back-end system 112. The access rights returned from the back-end system are then returned to the calling search crawler.

According to other aspects, the normalized API exposed by the API transformers 110A-110B may also be utilized by the query processors 120A-120B at query time to retrieve the access rights for documents identified in query search results. In this case, the query processors 120A-120B may call the normalized API exposed by the respective API transformer 110A-110B. In response to such a call, the API transformers 110A-110B translate the normalized call received from the search crawler into a call to the specific custom access rights API exposed by the back-end system 112. The access rights returned from the back-end system 112 are then returned to the calling query processor. Additional details regarding the use and operation of the API transformers 110A-110B are provided below. It should be appreciated that although only two Web server computers 104A-104B, one back-end system 112, and one client computer 102 have been illustrated in FIG. 1, any number of these computing devices may be present.

Figure 2:
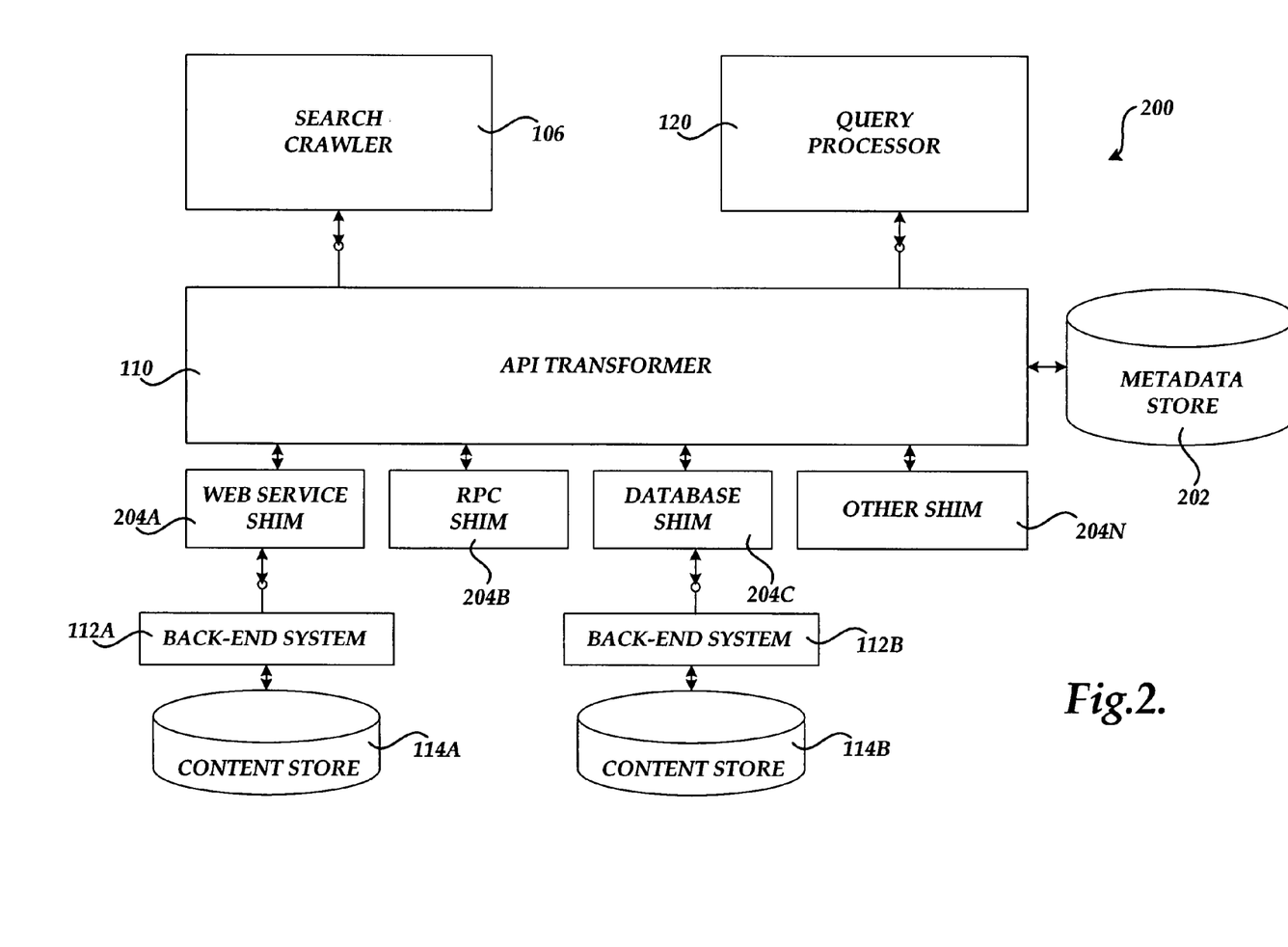
FIG. 2 is a software architecture diagram showing aspects of an API transformer program provided in one embodiment described herein.

Turning now to FIG. 2, a software architecture diagram showing aspects of an illustrative software architecture 200 for an enterprise search system that includes an API transformer 110 will be described. In particular, as shown in FIG. 2, the API transformer 110 exposes a normalized API for retrieving the access rights for a document. The normalized interface presented by the normalized API is a consistent interface that various applications executing within the enterprise search system may utilize to obtain access rights for a document, regardless of the back-end content store on which the document resides. For instance, a search crawler 106 and a query processor 120 may both utilize a method exposed by the normalized API to obtain access rights for documents. As will be described in greater detail herein, the methods exposed by the normalized API receive a parameter identifying the document for which access rights are requested and may, optionally, receive a user identifier for authentication purposes.

In one implementation, the normalized API exposed by the API transformer 110 includes a CHECKACCESS method by which the access rights to a group of documents may be retrieved for a single user. In one implementation, the CHECKACCSS method takes an array of document identifiers as a parameter and returns a long value that indicates whether the current user has access to each of the referenced documents. The CHECKACCESS method is typically utilized by the query processor 120 to determine if the current user has access rights to view a collection of search results.

The normalized API exposed by the API transformer 110 may also include a PERMITTEDUSERS method by which the access rights for all users for a collection of documents may be retrieved. This method takes an array of document identifiers as input and returns a string indicting the access rights of all users to each document identified in the array. The PERMITTEDUSERS method is typically utilized by the search crawler 106 to retrieve the access rights for all users to view documents retrieved during crawling. As will be described in greater detail below, the API transformer 110 is operative to dynamically transform calls to the normalized APIs into calls compatible with the custom APIs exposed by the back-end systems 112A-112B.

As mentioned above, the back-end systems 112A-112B may expose custom APIs for retrieving access rights data for documents stored in the content stores 114A-114B. For instance, in one implementation, a system that utilizes software from SAP AG may expose a GETDISPLAYABLECUSTOMERS method for retrieving the access rights for a user to one or more customers. This method takes as input an end user identity and a customer number, and returns a Boolean value indicating whether the end user has rights to view the customer. A SAP system may also expose a GETAUTHORIZEDUSERSFORCUSTOMER method by which all of the access rights to a particular customer may be retrieved. This method takes as input a customer number and returns a list of strings indicating the access rights to the referenced customer.

In one implementation, if the API transformer 110 receives a call to the CHECKACCESS method, it dynamically transforms the call into a call compatible with the GETDISPLAYABLECUSTOMERS method. For instance, if the received call is PERMITTEDUSERS(BDC://HOST/123/456?ID=34) (where the back-end system 112A is identified by the number 123), the API transformer 110 dynamically transforms this call into GETDISPLAYABLECUSTOMERS(34). The call is then executed at the back-end system 112A. The API transformer 110 will generate multiple calls to the GETDISPLAYABLECUSTOMERS method since this API gets results for a single customer document, whereas the CHECKACCESS method typically requests authorization check in batches. The API transformer 110 will also translate the implicit identity of the end user, contained in the operating system thread, to a string identity value that the back-end system utilizes.

If the API transformer 110 receives a call to the CHECKACCESS method such as CHECKACCESS(BDC://HOST/333/456?ID=36) (where the back-end system 112B is identified by the number 333), the API transformer 110 dynamically transforms this call into a call in the form of GETAUTHORIZEDUSERSFORCUSTOMER(36) directed to the back-end system 112B. It should be appreciated that these back-end APIs are merely illustrative and that the embodiments presented herein may be utilized with any custom API for retrieving access rights to a document.

In order to perform this processing, the API transformer 110 utilizes metadata stored in the metadata store 202 to transform a call to the normalized API into a call to the custom API exposed by the back-end systems 112A-112B. The metadata store 202 is utilized to store data that describes the actual APIs exposed by the back-end systems 112A-112B and the type of connections required to communicate with each of the back-end systems 112A-112B. For instance, in one implementation, a user familiar with the back-end system 112A may create a description of the actual APIs exposed by the system and the connection information in an extensible markup language ("XML") file. The XML file is uploaded to the enterprise search system and stored in the metadata store 202. Once the XML file has been uploaded, the connection to the access rights APIs provided by the back-end system 112A are immediately available for use. By allowing a user to declaratively define the interface to retrieve access rights from a back-end system, and processing the metadata in the manner described herein, no coding is required to interface with a new type of back-end content storage system.

In one implementation, the data stored in the metadata store 202 for each back-end system 112 includes data identifying each of the parameters in the API exposed by the back-end system. For instance, the parameters may be defined through the use of complex types that represent the parameters of a concrete API defined as aggregations of atomic types, such as strings or integers. Collections may be defined as groups of complex types. The data stored in the metadata store 202 may also include data indicating whether each parameter is an input parameter or an output parameter and default values for some or all of the parameters.

According to implementations, the data stored in the metadata store 202 for each back-end system 112 may also include the definition of each data type provided by the back-end system 112 and which fields uniquely identify an instance of the data type. For instance, data may be stored indicating that the data type is a customer in a SIEBEL back-end system or an order in an SAP system. Linkages, called tags, may also be stored in the metadata store 202 for the primitive types of the custom API and the parameters in the API corresponding to an instance of the data type. For instance, a parameter that is utilized to uniquely identify a document in the API may be tagged as such. When the search crawler 106 or the query processor 120 provides an identifier for the document for which access rights are requested, the API transformer 110 can insert the document identifier in the appropriate location in the call to the API provided by the back-end system 112. Additional details regarding this process are provided below.

According to implementations, the parameters of the back-end API that correspond to system-supplied values may also be tagged as such in the metadata store 202. For instance, according to one implementation, the system-supplied value is a parameter identifying a current user. In this manner, the query processor 120 can provide the identity of the current user to the API transformer 110. The API transformer 110 can then substitute the identity of the current user for the appropriate parameter in the call to the back-end system 112. Additional details regarding this process are provided below.

According to other aspects, the data stored in the metadata store 202 for each back-end system 112 may also include connection information for a third-party data store system so that a connection may be made to the system for executing the access check. The data may also include the type of protocol necessary to execute the back-end API. For instance, in implementations, a remote procedure call ("RPC") or a Web service may be utilized to execute the call to the back-end API.

In one implementation, the data stored in the metadata store 202 is organized as a series of data tables. For instance, one table may be utilized to store data identifying the various back-end systems and another table may be utilized to store information identifying the data type stored in each content store. Another table may be utilized to store data identifying the security methods exposed by each content store by data type. For instance, access to sales orders in a back-end system may utilize a different API than for accessing customers. A table may also be utilized to store data identifying each of the parameters of the custom back-end API, and other tables may be utilized to store information defining the atomic data types utilized by each parameter. It should be appreciated that the metadata store 202 may be organized in a variety of other manners.

As also illustrated in FIG. 2, the API transformer 110 utilizes one or more shims 204A-204N to perform the protocol-specific calls to the custom APIs exposed by the back-end systems 112A. For instance, a Web service shim 204A may be provided for making Web service calls, an RPC shim 204B may be provided for remote procedure calls, and a database shim 204C may be provided for interfacing with a database. Other shims 204N may also be utilized. As discussed briefly above, data defining the particular shim 204A-204N to use for each back-end system 112A or data type may be stored in the metadata store 202. For instance, data may be stored indicating that the Web service shim 204A should be utilized for certain types of documents stored in the content store 114A of the back-end system 112A. Data may also be stored in the metadata store 202 indicating that the database shim 204C should be utilized for retrieving access rights for documents stored in the content store 114B of the back-end system 112B.

Figure 3:
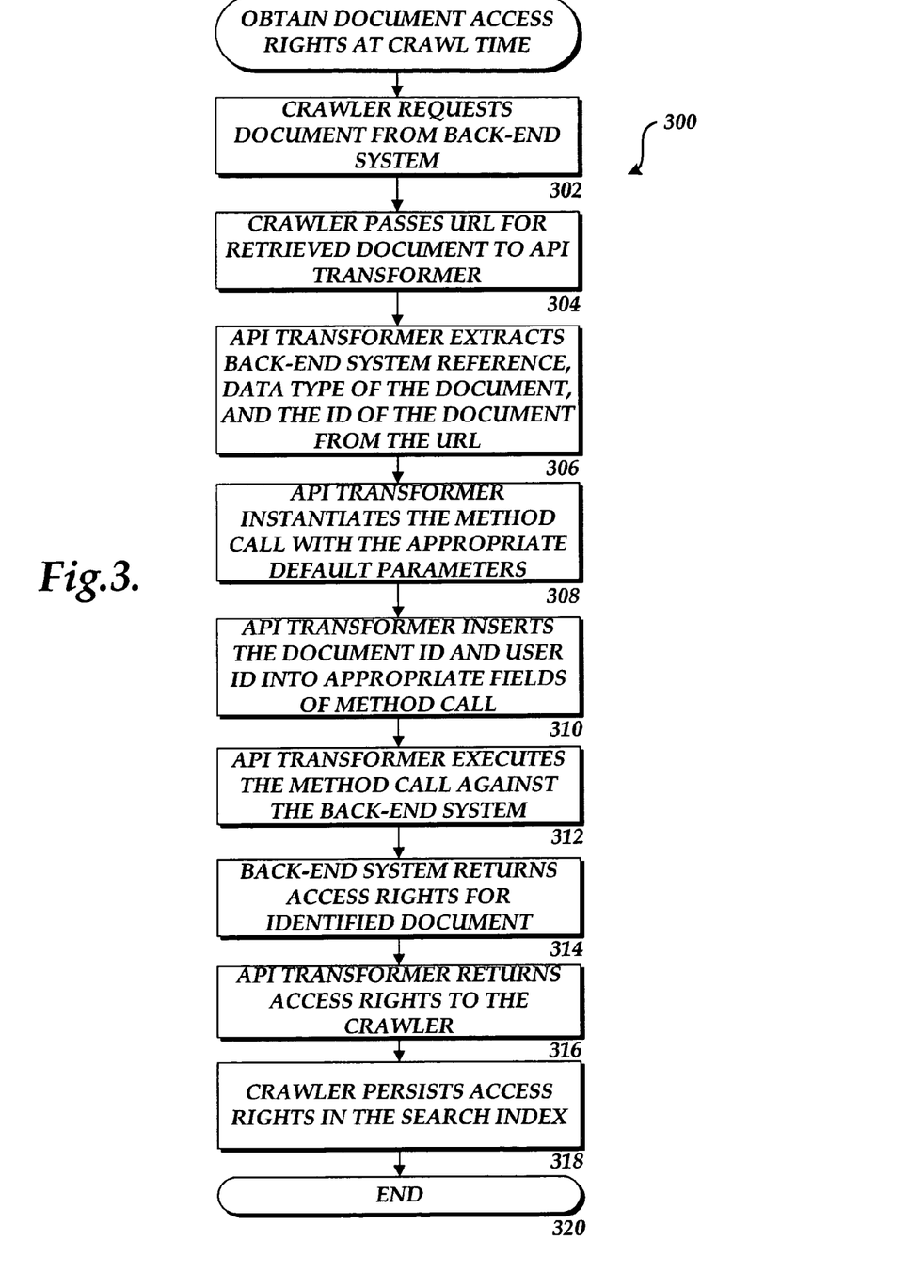
FIGS. 3 and 4 are flow diagrams illustrating processes provided herein according to embodiments for obtaining access rights for a document at the time the document is added to a search index and for obtaining access rights for a document at search time, respectively.

Referring now to FIG. 3, additional details will be provided regarding the embodiments presented herein for integrating enterprise search systems with custom back-end content store access control APIs. In particular, FIG. 3 is a flow diagram illustrating the operation of an enterprise search system including an API transformer 110 for obtaining access rights to a document at crawl time. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 300 begins at operation 302, where the search crawler 106 requests a document from one of the back-end systems 112A-112B. The routine 300 then continues to operation 302, where the search crawler 106 calls the API transformer 110 with the uniform resource ("URL") of the retrieved document. The routine 300 then continues to operation 306, where the API transformer 110 extracts the back-end system reference, the data type of the document, and the document identifier for the document from the received URL. For instance, if the received URL is bdc://hostname/123/456?id=34, the back-end system reference is 123, the data type is 456, and the document identifier is 34. Data in the metadata store 202 may then be referenced to determine that the back-end system is an SAP system, the data type is a customer in SAP, and the document identifier refers to a customer with customer number 34.

Once the back-end system reference, data type, and document identifier have been extracted, the routine 300 continues to operation 308. At operation 308, the API transformer 110 instantiates a call to the appropriate back-end system method. In one implementation, the call is instantiated using default values for each of the parameters stored in the metadata store 202. The routine 300 then continues to operation 310, where the API transformer 110 substitutes the document identifier received with the call to the normalized API for the appropriate parameter of the instantiated call to the back-end system API. The API transformer 110 utilizes data stored in the metadata store 202 to identify the correct location for the document identifier parameter. In an embodiment, a user identifier received with the call to the normalized API may also be inserted into the appropriate location in the call to the back-end system API.

Once the call to the custom API provided by the back-end system has been instantiated and all of the parameters have been set, the routine 300 continues to operation 312, where the API transformer 110 executes the call against the appropriate back-end system 112. As described above, the appropriate shim 204A-204N may be utilized to actually perform the remote method call. In response to execution of the method, the back-end system returns the requested access rights at operation 314.

The API transformer 110 then provides the returned access rights to the search crawler 106 in response to the original call to the normalized API exposed by the API transformer 110. This occurs at operation 316. At operation 318, the search crawler 106 stores the returned access rights in the search index 108, or other appropriate data store. The query processor 120 may utilize this information to trim search results at query time without requiring communication with the back-end system that provided the access rights. From operation 318, the routine 300 continues to operation 320, where it ends.

Figure 4:
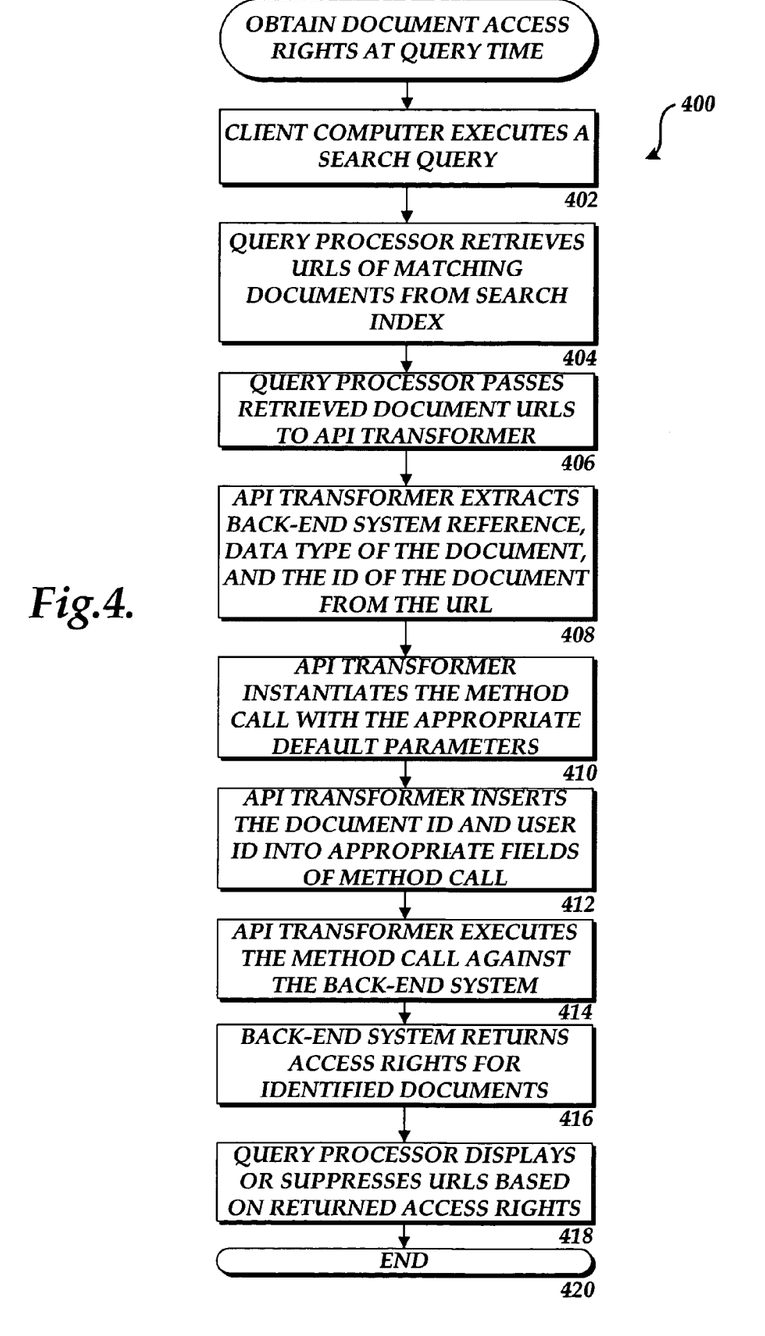

Referring now to FIG. 4, an illustrative routine 400 will be described for obtaining access rights to a document at search time in an enterprise search system that includes an API transformer 110. In particular, the routine 400 begins at operation 402, where the client computer 102 executes a search query at the query processor 120. In response to the execution of the search query, the routine 400 continues from operation 402 to operation 404, where the query processor 120 retrieves the URLs of documents matching the specified search terms from the search index 108. The query processor 120 then calls the normalized API exposed by the API transformer 110 with the identified URLs. This occurs at operation 406.

From operation 406, the routine 400 continues to operation 408, where the API transformer 110 extracts the back-end system reference, the data type of the document, and the document identifier for the document from the received URLs. For instance, if the received URL is bdc://hostname/123/456?id=34, the back-end system reference is 123, the data type is 456, and the document identifier is 34. Data in the metadata store 202 may then be referenced to determine that the back-end system is an SAP system, the data type is a customer in SAP, and the document identifier refers to a customer with customer number 34.

Once the back-end system reference, data type, and document identifier have been extracted, the routine 400 continues to operation 410. At operation 410, the API transformer 110 instantiates a call to the appropriate back-end system method. In one implementation, the call is instantiated using default values for each of the parameters stored in the metadata store 202. The routine 400 then continues to operation 412, where the API transformer 110 inserts the document identifier and the user identifier received with the call to the normalized API into the appropriate location in the call to the back-end system API.

Once the call to the custom API provided by the back-end system has been instantiated and all of the parameters have been set, the routine 400 continues to operation 414, where the API transformer 110 executes the call against the appropriate back-end system 112. As described above, the appropriate shim 204A-204N may be utilized to perform the remote method call. In response to execution of the method, the back-end system returns the requested access rights at operation 416. The API transformer 110 then provides the returned access rights to the query processor 120 in response to the original call to the normalized API exposed by the API transformer 110. At operation 418, the query processor 120 trims the search results based on the returned access rights. For instance, results that the current user does not have permission to read will not be displayed while results that the current user does have permission to read will be displayed. From operation 418, the routine 400 continues to operation 420, where it ends.

Figure 5:
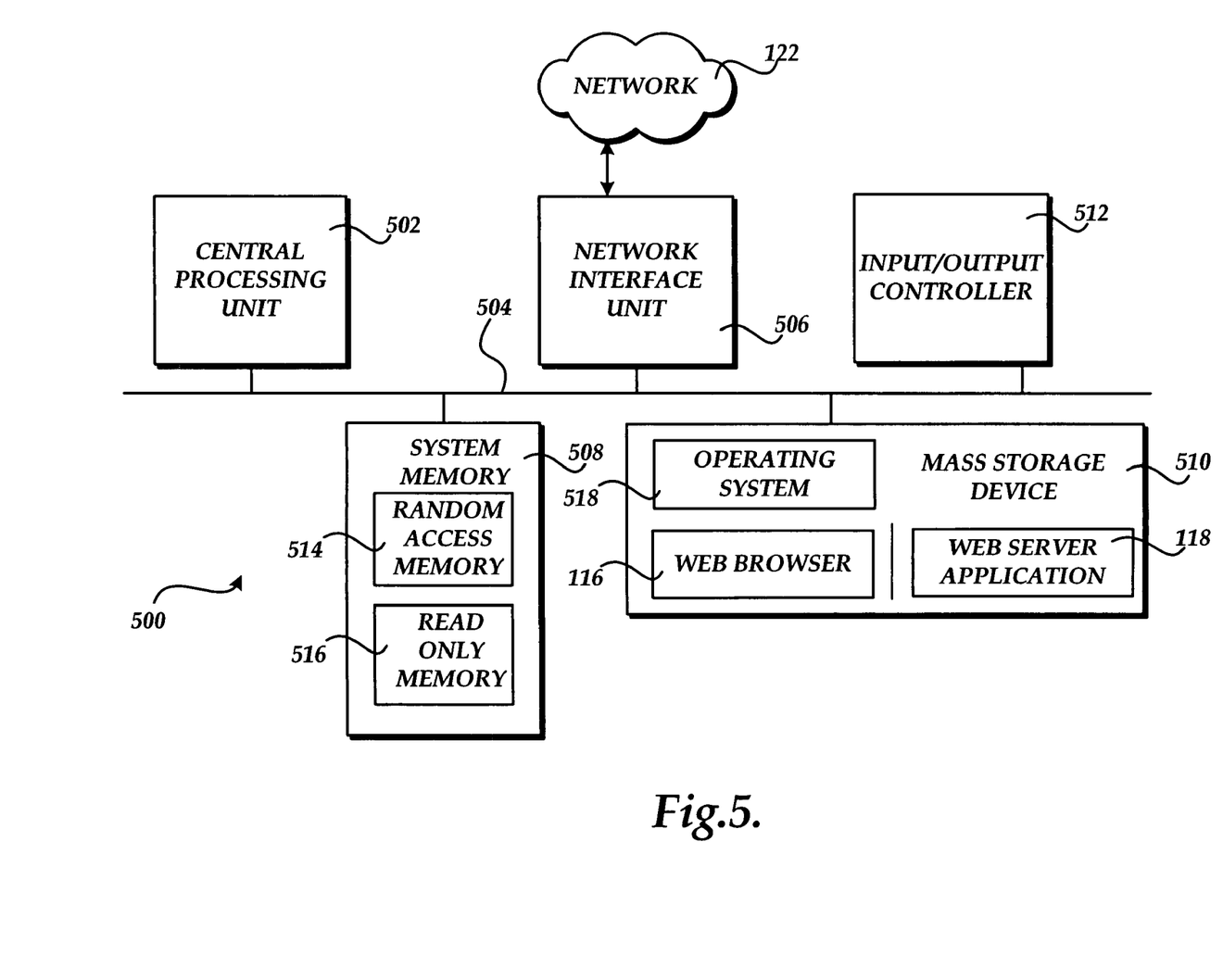
FIG. 5 is a computer architecture diagram showing a computer architecture suitable for implementing the various computer systems described herein.

Referring now to FIG. 5, an illustrative computer architecture for a computer 500 utilized in the various embodiments presented herein will be discussed. The computer architecture shown in FIG. 5 illustrates a conventional desktop, laptop computer, or server computer. The computer architecture shown in FIG. 5 includes a central processing unit 502 ("CPU"), a system memory 508, including a random access memory 514 ("RAM") and a read-only memory ("ROM") 516, and a system bus 504 that couples the memory to the CPU 502. A basic input/output system containing the basic routines that help to transfer information between elements within the computer 500, such as during startup, is stored in the ROM 516. The computer 500 further includes a mass storage device 510 for storing an operating system 518, application programs, and other program modules, which will be described in greater detail below.

The mass storage device 510 is connected to the CPU 502 through a mass storage controller (not shown) connected to the bus 504. The mass storage device 510 and its associated computer-readable media provide non-volatile storage for the computer 500. Although the description of computer-readable media contained herein refers to a mass storage device, such as a hard disk or CD-ROM drive, it should be appreciated by those skilled in the art that computer-readable media can be any available media that can be accessed by the computer 500.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 500.

According to various embodiments, the computer 500 may operate in a networked environment using logical connections to remote computers through a network 122, such as the Internet. The computer 500 may connect to the network 122 through a network interface unit 506 connected to the bus 504. It should be appreciated that the network interface unit 506 may also be utilized to connect to other types of networks and remote computer systems. The computer 500 may also include an input/output controller 512 for receiving and processing input from a number of other devices, including a keyboard, mouse, or electronic stylus (not shown in FIG. 5). Similarly, an input/output controller may provide output to a display screen, a printer, or other type of output device (also not shown in FIG. 5).

As mentioned briefly above, a number of program modules and data files may be stored in the mass storage device 510 and RAM 514 of the computer 500, including an operating system 518 suitable for controlling the operation of a networked desktop or server computer, such as the WINDOWS XP or WINDOWS VISTA operating systems from MICROSOFT CORPORATION of Redmond, Washington. Other operating systems, such as the LINUX operating system or the OSX operating system from APPLE COMPUTER, INC. may be utilized. It should be appreciated that although the embodiments presented herein are described in the context of a desktop or laptop client computer 102 and a remote server computer 104, many other types of computing devices and systems may be utilized to embody the various aspects presented herein.

The mass storage device 510 and RAM 514 may also store one or more program modules. In particular, the mass storage device 510 and the RAM 514 may store a Web browser 116, a Web server application 118, and the other program modules described above with respect to FIGS. 1 and 2. Other program modules may also be stored in the mass storage device 510 and utilized by the computer 500.

Based on the foregoing, it should be appreciated that systems, methods, and computer-readable media for integrating enterprise search systems with custom back-end content store access control APIs are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for integrating enterprise search with a custom document access control application programming interface (API), the computer-implemented method comprising performing computer-implemented operations for:
    storing declaratively defined metadata comprising an XML formatted file defining a custom API for obtaining one or more access rights for a document, wherein the declaratively defined metadata comprises data identifying one or more parameters of a method exposed by the custom API for obtaining access rights for a specified document and data indicating whether each of the parameters is an input parameter or an output parameter;
    exposing a normalized API for obtaining access rights for a document;
    receiving a call to a method exposed by the normalized API requesting access rights for the specified document, wherein the method exposed by the normalized API receives a parameter identifying a current user initiating a document request;
    in response to receiving the call to the method exposed by the normalized API, using the declaratively defined metadata to transform the call to the method exposed by the normalized API into a call to the method exposed by the custom API for obtaining the access rights for the specified document;
    receiving the access rights in response to the call to the method exposed by the custom API; and
    returning the requested access rights in response to the call to the method exposed by the normalized API.

2. The method of claim 1, wherein the declaratively defined metadata further comprises default values for the parameters.

3. The method of claim 2, wherein the declaratively defined metadata further comprises data identifying one of the parameters as corresponding to an identifier for a document for which access rights are requested, and wherein the method exposed by the normalized API receives a parameter identifying the document for which access rights are requested.

4. The method of claim 3, wherein using the declaratively defined metadata to transform the call to the method exposed by the normalized API into a call to the method exposed by the custom API for the requested access rights for the specified document comprises:
    instantiating the call to the method exposed by the custom API using the default values for the parameters;
    substituting the parameter identifying the document for which access rights are requested received with the call to the normalized API for the default value of the parameter corresponding to an identifier for a document for which access rights are requested; and
    executing the call to the method exposed by the custom API.

5. The method of claim 4, wherein the declaratively defined metadata further comprises data identifying one of the parameters as corresponding to a system supplied value.

6. The method of claim 5, wherein transforming the call to the method exposed by the normalized API into a call to the method exposed by the custom API for the access rights for the specified document further comprises:
    substituting the parameter identifying the current user for the default value of the parameter corresponding to a system supplied value.

7. The method of claim 2, wherein the call to the method exposed by the normalized API is generated by a search crawler program.

8. The method of claim 2, wherein the call to the method exposed by the normalized API is generated by a search query processor.

9. A computer-readable medium that is not a signal having computer-executable instructions stored thereon which, when executed by a computer, cause the computer to:
    expose a normalized application programming interface (API) for obtaining one or more access rights for a document;
    receive a call to a method exposed by the normalized API for retrieving access rights for a document, the call including a document identifier for a document and a user identifier identifying a current user initiating a document request;
    construct a call to a method exposed by a custom API for obtaining access rights for a document in response to the call to the method exposed by the normalized API, the call constructed using stored declaratively defined metadata comprising an XML formatted file that defines one or more default parameters of the method exposed by the custom API, the document identifier, and the user identifier, wherein the declaratively defined metadata further comprises data identifying one of the parameters as corresponding to the document identifier and one of the parameters as corresponding to the user identifier;
    execute the call to the method exposed by the custom API;
    receive the access rights for the document in response to the call to the method exposed by the custom API; and to
    return the access rights for the document in response to the call to the method exposed by the normalized API.

10. The computer-readable medium of claim 9, wherein the method exposed by the normalized API comprises a method for retrieving access rights for a plurality of documents, wherein the method exposed by the custom API comprises a method for retrieving access rights for a single document, and wherein the computer-readable medium has further computer-executable instructions stored thereon for constructing a separate call to the method exposed by the custom API for each of the plurality of documents identified in a call to the method exposed by the normalized API.

11. The computer-readable medium of claim 9, wherein the call to the method exposed by the normalized API is received from a search crawler program.

12. The computer-readable medium of claim 9, wherein the call to the method exposed by the normalized API is received from a search query processor.

13. A computer-implemented method for integrating enterprise search with a custom document access control application programming interface (API), the computer-implemented method comprising performing computer-implemented operations for:

storing declaratively defined metadata comprising an XML formatted file that defines one or more methods exposed by a custom document access control API, the declaratively defined data comprising default values for one or more parameters used by the methods, data identifying the parameters that correspond to a document identifier, and data identifying the parameters that correspond to a user identifier;

exposing a normalized API for obtaining one or more access rights for a document, the access rights being stored in a back-end computing system and accessed using one of the methods exposed by the custom document access control API;

receiving a call to a method exposed by the normalized API, the call including a document identifier corresponding to a document for which access rights should be obtained and a user identifier for a current user initiating a document request;

in response to the call to the method exposed by the normalized API, using the declaratively defined metadata to translate the call to the method exposed by the normalized API into a call to a method exposed by the custom document access control API using the default values, the document identifier, and the user identifier;

in response to the call to the method exposed by the custom document access control API, receiving one or more access rights for the document; and returning the access rights for the document in response to the call to the method exposed by the normalized API.

14. The method of claim 13, wherein the call to the method exposed by the normalized API is generated by a search crawler program.

15. The method of claim 14, wherein the method exposed by the normalized API is operative to retrieve the access rights for one or more users to a single document.

16. The method of claim 13, wherein the call to the method exposed by the normalized API is generated by a search query processor.

17. The method of claim 15, wherein the method exposed by the normalized API is operative to retrieve the access rights to one or more documents for a current user of the search query processor.

* * * * *